United States Patent [19]

Cisar et al.

[11] Patent Number: 5,709,961
[45] Date of Patent: Jan. 20, 1998

[54] LOW PRESSURE FUEL CELL SYSTEM

[75] Inventors: Alan J. Cisar, Cypress; Oliver J. Murphy, Bryan; Stanley F. Simpson, Houston, all of Tex.

[73] Assignee: Lynntech, Inc., College Station, Tex.

[21] Appl. No.: 656,968

[22] Filed: Jun. 6, 1996

[51] Int. Cl.$^6$ ...................................... H01M 8/12
[52] U.S. Cl. ........................ 429/32; 429/33; 429/39
[58] Field of Search ................... 429/32, 33, 38, 429/39

[56] References Cited

U.S. PATENT DOCUMENTS

| | | |
|---|---|---|
| 3,134,697 | 5/1964 | Niedrach . |
| 3,297,484 | 1/1967 | Niedrach . |
| 3,297,485 | 1/1967 | Tocker ........................ 429/33 |
| 3,432,355 | 3/1969 | Niedrach et al. . |
| 4,876,115 | 10/1989 | Raistrick ........................ 427/115 |
| 5,171,646 | 12/1992 | Rohr ........................ 429/32 X |
| 5,242,764 | 9/1993 | Dhar ........................ 429/30 |
| 5,246,792 | 9/1993 | Watanabe ........................ 429/33 |

*Primary Examiner*—Stephen Kalafut
*Attorney, Agent, or Firm*—Patterson & Streets, L.L.P.

[57] ABSTRACT

The present invention provides a lightweight fuel cell system that operates with fuel and oxidant gases at near atmospheric pressures. The fuel cell system uses a monopolar cell design where the electrode surfaces are sufficiently accessible to the gases that it is not necessary for the oxidizer and reducer gases to be compressed. The fuel cell is ideal for personal use due to its light weight, compact size and self contained operation. An added feature of the present invention is that individual fuel cells may be linked together to achieve greater voltages or currents.

27 Claims, 5 Drawing Sheets

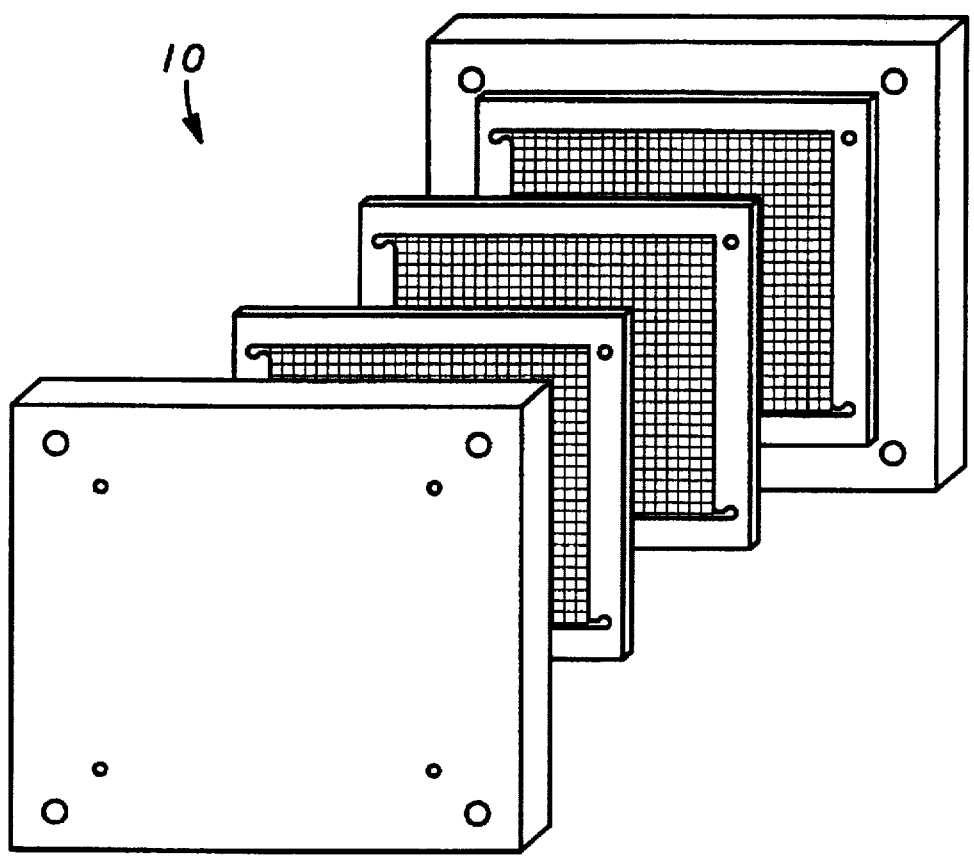
FIG. 1 [PRIOR ART]
FIG. 2 [PRIOR ART]

LOW PRESSURE FUEL CELL SYSTEM

FIELD OF THE INVENTION

The present invention relates generally to fuel cells. More particularly, the present invention relates to a lightweight monopolar fuel cell design that operates at low gas pressures.

BACKGROUND OF THE RELATED ART

Generally, a fuel cell is a device which converts the energy of a chemical reaction into electricity. It differs from a battery in that the fuel and oxidant are stored external to the cell, which can generate power as long as the fuel and oxidant are supplied. A fuel cell produces an electromotive force by bringing the fuel and oxidant in contact with two suitable electrodes and an electrolyte. A fuel, such as hydrogen gas, is introduced at one electrode where it reacts electrochemically with the electrolyte to impart electrons to the fuel electrode. Protons are formed by dissociation of the hydrogen at the first electrode and pass through the electrolyte to the second electrode. Simultaneously, an oxidant, such as oxygen gas or air, is introduced to the second electrode where it reacts electrochemically with the electrolyte to consume the electrons and the protons at the second electrode. The halfcell reactions for a hydrogen consuming fuel cell at the two electrodes are, respectively, as follows:

$$H_2 \rightarrow 2H^+ + 2e^-$$

$$\tfrac{1}{2}O_2 + 2H^+ + 2e^- \rightarrow H_2O$$

Connecting the two electrodes through an external circuit causes an electrical current to flow in the circuit and withdraws electrical power from the cell. The overall fuel cell reaction produces electrical energy, which is the sum of the separate halfcell reactions written above, and heat.

In practice, fuel cells are not operated as single units, but are connected in a series, stacked one on top of the other, or placed side by side. A series of fuel cells, referred to as a fuel cell stack, are normally equipped with a manifold system for the distribution of two gases. The fuel and oxidant are directed with manifolds to the electrodes, and cooling is provided either by the reactants or by a cooling medium. Also within the stack are current collectors, cell-to-cell seals, insulation, piping, and instrumentation. The stack and associated hardware make up the fuel cell module.

In fuel cells where a solid polymer electrolyte ("SPE") or proton exchange membrane ("PEM") is used, the membrane acts as the electrolyte as well as a barrier for preventing the mixing of the reactant gases. A PEM fuel cell is described in greater detail in Dhar, U.S. Pat. No. 5,242,764, which is incorporated herein by reference.

Much research and development has been devoted to improving the power-to-weight ratio for proton exchange membrane ("PEM") fuel cells. Most of this research has involved increasing the power per unit volume of relatively heavy stacks based on a conventional bipolar filter press design 10 with graphite structure elements, as shown in FIG. 1. A full description of filter press type fuel cells may be found in Neidrach, U.S. Pat. No. 3,134,697 which is incorporated herein by reference. While improvements in the filter press style fuel cells have provided significant increases in power per unit volume, the overall systems that have evolved are large, heavy, and relatively complex, with compressors to supply air and pumped water cooling systems to remove excess heat.

More recently, efforts have been made to reduce the stack weight by replacing the heavy carbon elements with thinner and lighter, metal elements. However, these units were designed for large scale applications, some on the order of about 30 kW, and, therefore, require the same stack ancillary equipment mentioned above. Furthermore, the ancillary equipment included with the stack in these systems has been designed to operate efficiently at the kilowatt level. Scaled down versions of these systems have been attempted in applications that require much less power, such as within the range between about 50 and about 150 Watts. However, these systems are not well suited for stack outputs in the tens or hundreds of watts, since the rotating components, such as pumps and compressors, do not scale down well. As a result, even small scale systems of this design are too heavy, for many small applications, such as for portable applications and personal use.

Therefore, the relevant objective for portable and personal applications is not Watts per unit volume but Watts per unit weight, i.e. W/lb. Efforts to adapt the standard bipolar filter press design to low pressure operation, thereby eliminating much of the ancillary equipment, have met with some limited success, producing stacks with power densities as high as 61 W/lb. While this is a useful power density, these systems require complicated and expensive assembly.

Therefore, there is a need for a lightweight fuel cell system than provides an improved power density (W/lb) and eliminates much of the ancillary equipment. It would be desirable if the fuel cell operated efficiently in the 50 to 150 Watt range to supply electricity to a variety of common electrical devices. It would also be desirable if the fuel cell had no more than a few moving parts to reduce maintenance and avoid breakdowns. It would be further desirable to have a fuel cell system that was available in modules that could be configured together to meet the power requirements of specific applications.

SUMMARY OF THE INVENTION

The present invention provides an apparatus comprising: a) an array of monopolar cells electrically connected together, each cell comprising a membrane and electrode assembly and an electrically conducting frame securing the edge of the assembly; b) a fuel gas chamber defined by the array and an electrically insulating member sealed to the edge of the array; and c) a fuel gas inlet port into the chamber. In one embodiment, the membrane and electrode assembly comprises a gas diffusion anode including an electrically conducting member, a gas diffusion cathode including an electrically conducting member, and a proton exchange membrane formed between the anode and cathode.

The invention also encompasses a fuel cell comprising: a) a plurality of membrane and electrode assemblies, each assembly having an anode including an electrically conducting member, a cathode including an electrically conducting member and a proton exchange membrane formed between the anode and cathode; b) a pair of electrically conducting cell frames securing the edges of each membrane and electrode assembly, wherein one cell frame is in electrical contact with the anode and another cell frame is in electrical contact with the cathode, wherein the anode and cathode frames of the same cell are electrically insulated from each other, and wherein each anode frame is electrically connected to no more than one cathode frame of an adjacent cell; and c) a fuel gas chamber in communication with the anodes, wherein the anodes are exposed to an oxidizable gas.

Another aspect of the invention provides a fuel cell stack comprising: a) a plurality of individual cells including a

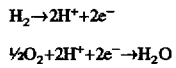

membrane and electrode assembly having an anode, an electrically conducting member in contact with the anode, a gas diffusion cathode, an electrically conducting member in contact with the cathode, and a proton exchange membrane between the anode and the cathode, wherein the electrically conducting member in contact with the anode in a first cell is electrically coupled to the electrically conducting member of a cathode in a second cell; b) a fuel gas chamber adjacent the anodes for delivery of fuel; and c) a fuel gas inlet port into the chamber. In one embodiment, the electrically conducting member is a frame around the perimeter of a membrane and electrode assembly. The anode may be a gas diffusion anode or a liquid compatible anode.

Yet another aspect of the invention provides a modular fuel cell system comprising a plurality of fuel cell stacks, each stack having an anode, a cathode, a fuel gas chamber, a male connector plug and a female connector plug, each plug including electrical contacts and a fuel gas coupling, wherein a male plug of a first stack and a female plug of a second stack can be coupled together so that the fuel gas chambers are in fluid communication and stacks are in electrical communication. In one embodiment, the configuration of the electrical contacts in the plugs determines whether the cells are connected in series or parallel.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a standard filter press type fuel cell stack 10 showing the arrangement of the bipolar cell plates and end plates.

FIG. 2 is a cross-sectional view of a standard PEM fuel cell membrane and electrode assembly (M&E) 20.

DETAILED DESCRIPTION OF THE INVENTION

Figure 3:
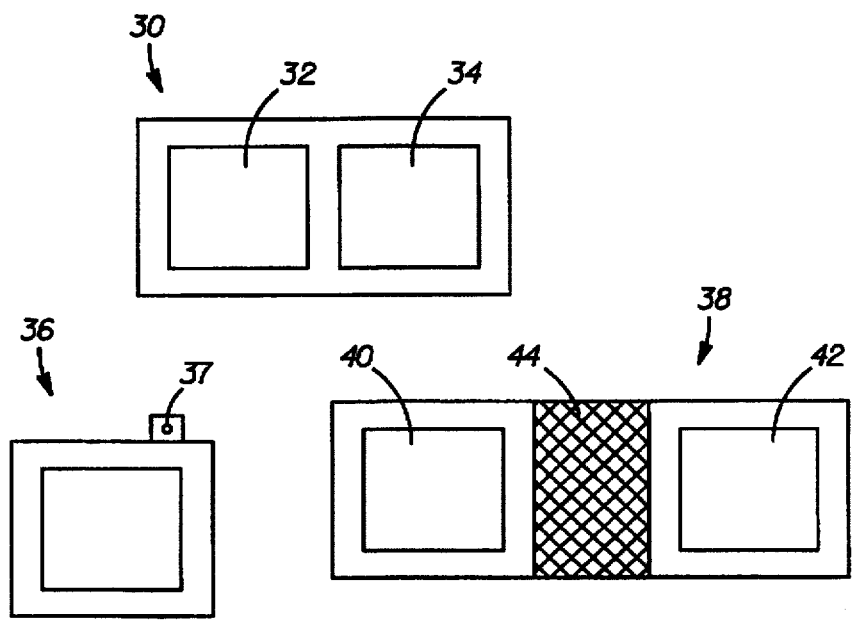
FIG. 3 illustrates the key components for a monopolar cell stack, including a terminal cell frame 36, a flat bipolar cell frame 30 and a curved bipolar cell frame 38.

The present invention provides a lightweight fuel cell system that operates with fuel and oxidant gases at near atmospheric pressures. The fuel cell system uses a monopolar cell design where the electrode surfaces are sufficiently accessible to the gases that it is not necessary for the oxidizer and reducer gases to be compressed. The fuel cell is ideal for personal use due to its light weight, compact size and self contained operation. An added feature of the present invention is that individual fuel cells may be linked together to achieve greater voltages or currents.

The present invention provides a monopolar fuel cell system based on the use of flat cell frames that support the cell components. A monopolar design is lighter than a bipolar or filter press design for a number of reasons. First, since the monopolar fuel cell is not under compression, the components, such as the cell frames, can be much thinner than the structure of a bipolar fuel cell which relies on the thickness of the components to maintain precise spacings for gas flow therethrough. The primary limitation on the thickness of the components is that the component in question must have sufficient strength to maintain its integrity during use in various applications. This permits the use of a wide variety of lightweight conductive materials, such as a thin titanium sheet.

Another reason that the monopolar fuel cell of the present invention weighs less than conventional systems, is that many components of a conventional system are no longer necessary and may be eliminated entirely. For example, the preferred monopolar fuel cell uses ambient air as the oxidizer, rather than compressed air or oxygen, as the oxidizer. Because it is unnecessary to compress the oxidizer, the conventional gas control system is unnecessary and may be eliminated. Instead, the gas is supplied to the cathode by either free or forced convection. In either case, there is no need for an enclosed cathode flow field.

In addition, the bipolar plates of conventional fuel cells, which separate anode and cathode flow fields and conduct current from one cell to the next, are no longer needed and may be eliminated. The plates are not needed to separate flow fields because the anode and cathode flow fields of the present invention are open to the sealed reducing gas chamber and the atmosphere, respectively, and are effectively separated by the cells themselves. Furthermore, the bipolar plates are not needed to conduct electrical current from one cell to the next since this function is performed by the electrically conducting cell frames.

Another component or system of conventional fuel cell systems that is no longer required is the heat transfer system. The fuel cell system of this invention has a much larger ratio of exposed area to active area and, therefore, dissipates waste heat directly to the surrounding air without the need for a circulating heat transfer fluid, a pump to circulate the fluid, or heat exchangers inside the stack to collect the heat and outside the stack to dissipate the heat.

Eliminating moving parts from fuel gas systems, in accordance with the present invention, eliminates the parasitic power losses required to drive the motors involved and the potential for malfunctions. Furthermore, eliminating small motors and moving parts in fuel gas systems reduces maintenance and malfunctions, particularly in applications where the system is portable.

Another advantage of monopolar fuel cell systems is the low cost of manufacture. Because the entire stack is assembled from a series of flat, or nearly flat, components, all of the parts can be cut from flat sheets. No complex machining steps are required.

The electrodes used in the present invention are gas diffusion electrodes comprising a proton exchange membrane ("PEM"), catalyst layers on either side of the PEM, and gas diffusion layers over the catalyst layers. Gas diffusion electrodes, their construction and fabrication, are generally described in Murphy et al., U.S. Pat. No. 5,460,705 which is hereby incorporated by reference. The preferred PEM is generally a polymer material having sulfonate functional groups contained on a fluorinated carbon backbone, such as the perfluorinated sulfonic acid polymers available under the tradename NAFION from Du Pont de Nemours, E. I. & Co of Wilmington, Del. The gas diffusion layers preferably comprise a carbon conducting paper or cloth. In one preferred embodiment, a platinum catalyst is supported on the carbon paper before hot pressing with the PEM. However, it is also anticipated that the same general construction can be achieved using thin film electrodes, where the catalyst is deposited directly onto the PEM rather than the carbon paper.

It is preferred that the reducing gas be delivered to the anodes from a supply vessel through a pressure regulating feed valve and feed line connected to the reducing gas chamber. The anode surface of each individual cell is directly exposed to the reducing gas in the chamber and does not require enclosed anode flow fields for delivery of the reducing gas. Since the reducing gas chamber allows the reducing gas to flow freely over the anode surface, it is not necessary to compress the reducing gas for delivery through narrow passages or flow fields. Therefore, the reducing gas may be supplied at any pressure. However, it should be noted that while the fuel cell does not require the reducing gas, such as hydrogen, to be pressurized, it is generally preferred that the hydrogen is stored in a pressurized vessel that can be transported along with the fuel cell itself. It is further preferred that the pressurized hydrogen be delivered from the vessel to the reducing gas chamber through a step-down regulator to a pressure generally below about one atmosphere, but most preferably below about 2 psi to avoid displacing the membrane and electrode assemblies out of their frames.

The fuel cell consumes the fuel at the anode, produces water at the cathode and generates a flow of electricity for use in various applications. The water that is generated at the cathode is useful to keep the PEM moist so that it will conduct protons efficiently. Water will evaporate from the cathode surface into the air and provide some cooling to the cells. However, because there is no external source of water to the PEM, the air flow rate and temperature should not be allowed to dry out the PEM.

In one aspect of the invention, it is possible to fabricate the cells with the same catalyst, preferably platinum (Pt) or a platinum-containing alloy, and the same catalyst loading on both the anode and the cathode. Therefore, the cells may be cut, handled and fabricated without regard for their orientation. This may be advantageous in some applications, since the anode and cathode cannot be distinguished by appearance alone. On the other hand, because Pt has greater catalytic activity for hydrogen gas than for oxygen gas, a cell with better precious metal utilization is obtained when the platinum loading is lower on the anode than on the cathode.

The sheets and other components of the present invention may be assembled and coupled in many different ways and with many different means as will be recognized in the art. In particular, it should be recognized that the components may be fastened with mechanical fasteners, such as bolts, screws, clamps, straps, rivots and the like, adhesives, and welding of the components. However, it is most preferred that all of the components be fastened using adhesives and welding, so that a minimal amount of material is added to the fuel cell and a minimal number of parts are needed. Bonding processes are also generally preferred since this type of assembly can easily be automated.

FIG. 2 shows the structure of a standard fuel cell membrane and electrode (M&E) assembly 20 intended for use in a bipolar stack, with current collection over most of the back of the electrode. The M&E assembly consists of a membrane 22, a catalyst layer 24, a gas diffusion layer 26 and a conductive cloth backing 28. As illustrated, a complete M&E assembly includes the same layers formed on both sides of the membrane.

Figure 4:
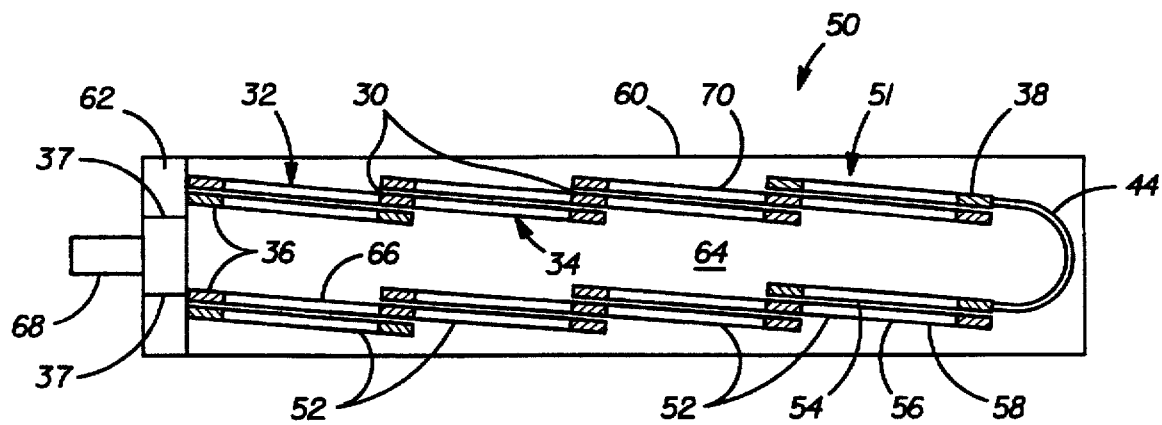
FIG. 4 is a cross-sectional view of a fuel cell stack 50 comprised of monopolar cells based on the use of the bipolar cell frame components of FIG. 3.

Now referring to FIG. 3, a face view of three types of cell frame components are shown. First, there is the dual cell frame 30 which has openings 32, 34 for exposing two M&E assemblies. The dual cell frames 30 are overlapped (as shown in FIG. 4) so that the opening 32 of a first frame 30 coincides with the opening 34 of an adjacent frame 30. The two metal frames 30 hold the M&E assemblies firmly around the edge of the assembly.

Now referring to FIG. 4, a top cross-sectional view of a fuel cell stack 50 is shown. The overlapping metal frames 30 can be repeated any number of times to form the multi-cell stack or fin 51. At the end of the series of cells, a terminal cell frame 36 may be used to overlap one of the openings 32, 34 and also to provide an electrical contact 37 for conducting electricity to and from the stack. The curved dual cell frame 38 has two openings 40, 42 like the dual cell frame 30, except that it has an enlarged central region 44 which can be curved to form the distal end of a fin 51. The fin 51 can have any number of cells 52, but is shown here having eight cells connected in series. In a fashion similar to the M&E assembly of FIG. 2, the cells 52 have an M&E assembly comprised of a central PEM 54, a catalyst coating 56 and gas diffusion layer 58.

Side plates 60 are sealed to the top and bottom edges of the fin 51 and an end cap 62 is sealed to the open end of the fin 51. The plates 60 and cap 62, in cooperation with the fin 51, form a chamber 64 in communication with all of the anode surfaces 66. A gas inlet port 68 is provided in the end cap 62 for the introduction of a fuel to the chamber 64.

The two-sided arrangement shown in FIG. 4 represents a preferred embodiment of the invention. This arrangement permits the largest number of cells to share a common internal fuel gas chamber. It is also possible to arrange the series of cells as a flat strip, where the opposing surface of the internal chamber is an inactive surface. While generally less efficient in terms of weight or volume, in some applications, this may be a preferable arrangement.

The preferred fuel is a reducing gas, with the most preferred gas being hydrogen. In operation, each of the individual cells of the fuel cell 50 has a cathode surface 70 that is exposed to the air as the oxidizing gas. Therefore, the fuel cell 50 operates at low pressures and without any moving parts. The cell is also lightweight, easy to manufacture and relatively inexpensive.

Unlike a conventional bipolar system, this fuel cell collects the current only from the edges of the electrode, leaving the entire face open. Leaving the area of the electrode as open as possible reduces the potential for interference with diffusion and facilitates the supply of air under ambient conditions without the need for a compressor or other high powered air moving device.

Figure 5:
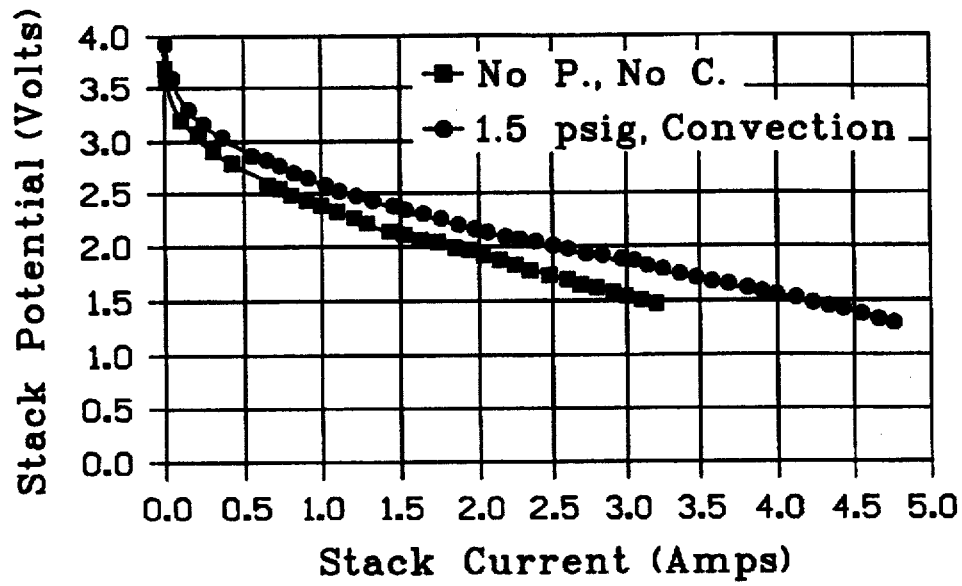
FIG. 5 is a graph showing the effect of both increased fuel pressure and forced convection on the performance of a four cell fuel cell stack.

A four cell version of fuel cell 50 of the present invention was constructed and operated using hydrogen gas as the fuel and ambient air as the oxidizer. The performance of the fuel cell is illustrated in FIG. 5 by a graph of stack potential (Volts) as a function of stack current (Amps). As is apparent from the data displayed in that figure, increasing the fuel pressure slightly (1.5 psig) and using a small fan to create a forced convection flow over the stack produced a marked improvement in the stack's performance.

Figure 6A:
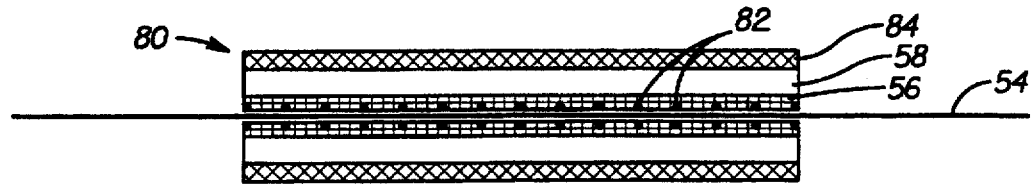
FIGS. 6(a-c) are cross-sectional views of three configurations for an M&E produced with a metal conductive element (grid) 82 included as part of the structure.

Now referring to FIGS. 6(a-c), the structures of three different M&E assemblies specifically intended for use in a monopolar fuel cell are shown. In the configuration of FIG. 6(a), a metal grid 82 is embedded in the front surface of the electrode 80 and in direct contact with both the electrocatalytically active portion 56 of the electrode and the membrane 54. The advantage of this arrangement is good electrical contact with the electrocatalyst for efficient current collection and the least interference with gas diffusion within the electrode. The disadvantages are the difficulty in making good electrical contact between the current collection plates 30 and both the metal grid 82 and the conductive carbon cloth 84 at the back of the electrode, the potential for damaging the membrane 54 with the grid while attaching the electrode by hot pressing and a loss of area for the interface between the electrocatalyst and the membrane. Although the latter can be partly compensated for by appropriate impregnation of the electrode with a NAFION solution, the long diffusion path for protons around the grid through the recast membrane leads to relatively high local resistances.

Figure 6B:
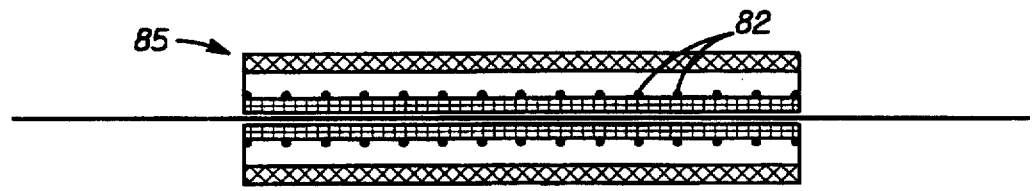

FIG. 6(b) shows an M&E configuration 85 with the metal grid 82 in the center of the electrode, between the uncatalyzed carbon gas diffusion layer 58 and the active electrocatalyst layer 56. The advantages of this configuration are good contact between the grid 82 and the electrocatalyst 56 for efficient current collection and no blockage of the interface between the membrane 54 and the active electrocatalyst 56. The disadvantages of this configuration are a more difficult fabrication procedure and possible interference with gas diffusion inside the electrode.

Figure 6C:
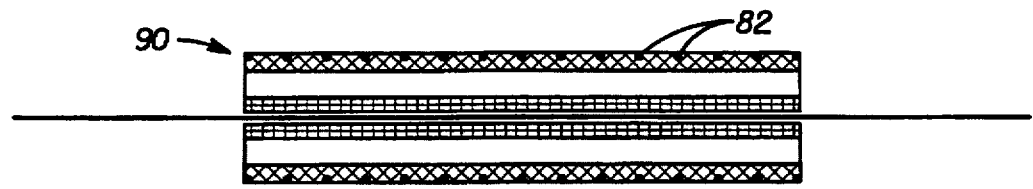

FIG. 6(c) shows an M&E configuration 90 with the grid 82 on the back side of the electrode. The advantages of this configuration are good contact between the grid 82 and the cell frame 30 (see FIG. 4) for efficient current collection, no blockage of the interface between the membrane and the active electrocatalyst, and simpler fabrication than the arrangement with the grid inside the electrode. The disadvantages of this arrangement are the creation of vertices on the outer face of the electrode which can act as anchors for water drops leading to a loss in available area for gas diffusion and the difficulty of insuring that the grid will stay in contact with the electrode for an indefinite period of time.

Figure 7:
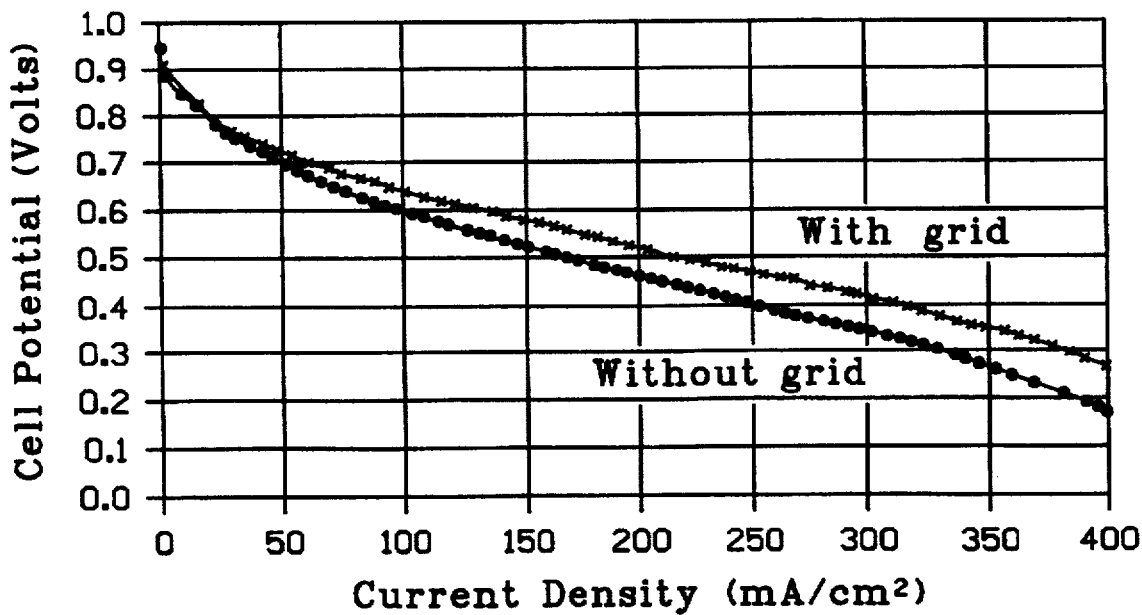
FIG. 7 is a graph showing the improvement in performance produced by attaching a metal grid to the back of the electrode.

The configuration 90 of FIG. 6(c), with the grid on the back side of the electrode, gave the best performance. FIG. 7 shows the improvement in monopolar fuel cell performance produced by the inclusion of a metal grid at the back of the electrode.

Figure 8:
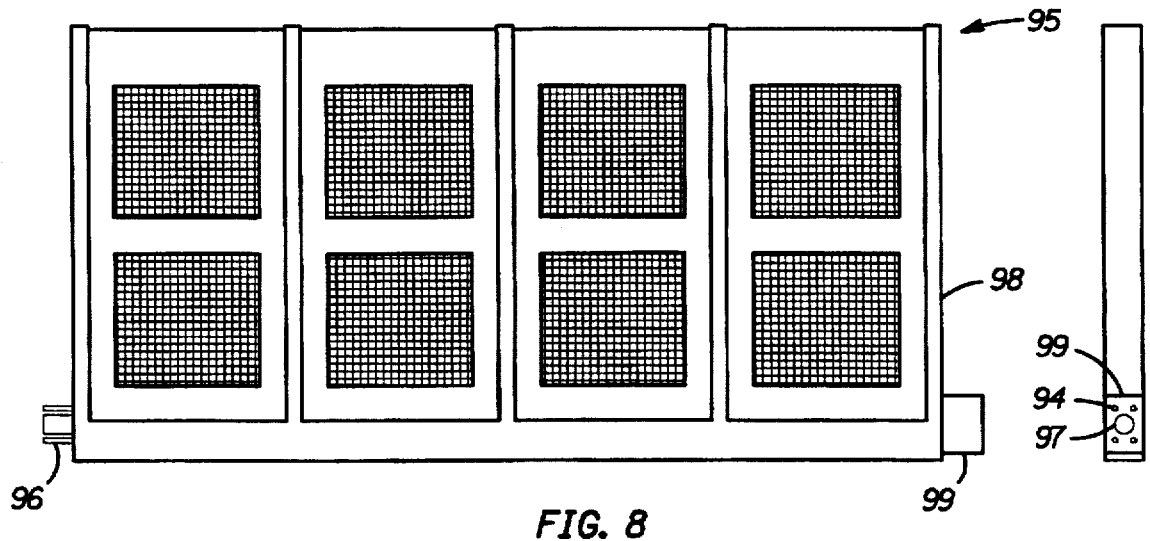
FIG. 8 is an exemplary monopolar fuel cell stack 95.

A practical power system needs to have an output of at least 12 volts. FIG. 8 shows a module design 95 that would stack head-to-tail (end 96 of one module to end 98 of another module) using a combined plug 97 with four electrical connections 94 and a gas connection 97. Inside the module, terminal ends of the cells are electrically connected into groups, each of which will supply power at a potential of 12 Volts. The mating plug on the item being powered (not shown) can be wired to utilize the groups in parallel for 12 Volts, or in series for 24 Volts. As many modules 95 as desired can be connected together to increase the current available, but the voltage will remain constant at either 12 or 24 Volts. It is anticipated that the modules could be stacked side-by-side or end-to-end and operate equally well.

The present invention provides an open fin design that produces a very light fuel cell system. The power-to-weight ratio for the fins alone (no firings) has been shown to be as high as 220 W/lb. When the weight of the fittings needed to connect the stack to the fuel supply and the next module are included, this drops to a still impressive 180 W/lb. While this is the lightest arrangement, this design is only practical for enclosed applications because the lightweight construction leaves the cell subject to damage.

Figure 9:
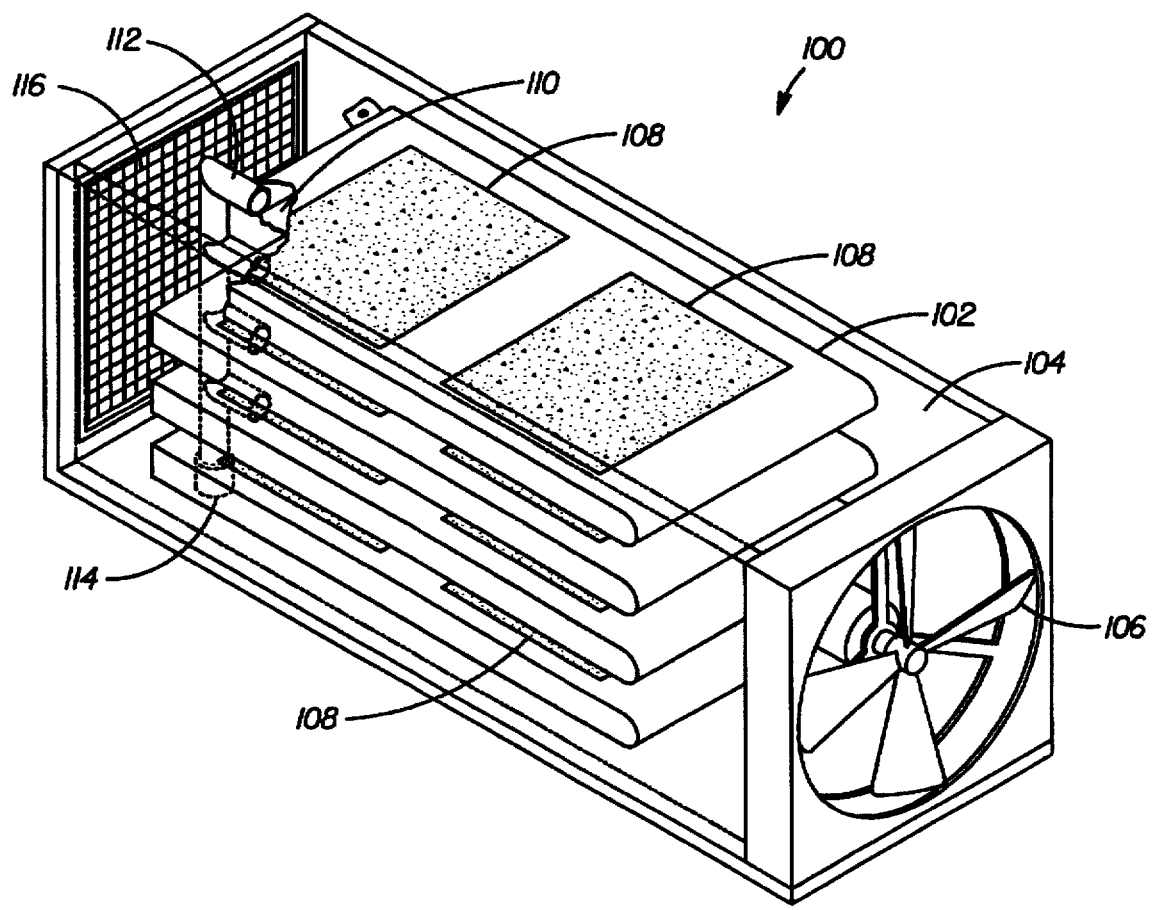
FIG. 9 is a perspective view of a compact fuel cell 100 having a fan 106 to provide forced convention of air over the cathodes 108.

FIG. 9 shows an even more compact and useful fuel cell configuration 100. In this arrangement a plurality of fins 102 are enclosed in a common housing or shell 104, with a small fan 106 located at one end to move a continuous stream of air over the cathodes 108. With 4 mm thick fins, a fin-to-fin spacing of 2–3 mm would be required, or about 4 fins per inch. This arrangement produces a projected stack volume of about 335 ml for a module sized to produce about 50 Watts of power. It is likely that this volume can be reduced further, with a volume below about 300 ml possible.

The fuel is delivered to each anode chamber 110 through a gas manifold 112, preferably located at the rear of the fins. A fuel source, such as a pressurized hydrogen tank and step-down pressure regulator (not shown), is connected to the coupling 114 on the manifold. With hydrogen in communication with the anodes and air passing over the cathodes 108 and out the back grill 116 of the housing 104, the fuel cell 100 will generate electricity for use in any 12 or 24 Volt DC application.

The addition of the fan 106 and the shell 104 increase the weight of the system 100 slightly, thereby reducing the power/weight ratio to about 150 W/lb for a 50 Watt module. Although the fuel cell 100 represents an increase in the amount of weight needed for any specified power output, the fuel cell is still quite light and the smaller size makes the cell much more portable and easy to carry.

While the foregoing is directed to the preferred embodiment of the present invention, other and further embodiments of the invention may be devised without departing from the basic scope thereof, and the scope thereof is determined by the claims which follow.

What is claimed is:

1. An apparatus comprising:
    a) an array of monopolar cells, each cell comprising a membrane and electrode assembly and first and second electrically conducting frames contacting opposing faces of the membrane and electrode assembly and electrically connecting the first electrically conducting frame of a first cell to the second electrically conducting frame of an adjacent cell;
    b) a fuel gas chamber defined by the array and an electrically insulating member sealed to the edge of the array; and
    c) a fuel gas inlet port into the chamber.

2. The apparatus of claim 1, wherein each membrane and electrode assembly comprises a gas diffusion anode, a gas diffusion cathode, and a proton exchange membrane formed between the anode and cathode.

3. An apparatus comprising:
    a) an array of monopolar cells, each cell comprising a membrane and electrode assembly; the array further comprising a plurality of bipolar cell frames having an anodic portion contacting an anode of a first monopolar cell and a cathodic portion contacting a cathode of an adjacent monopolar cell;
    b) a fuel gas chamber defined by the array and an electrically insulating member sealed to the edge of the array; and
    c) a fuel gas inlet port into the chamber.

4. The apparatus of claim 1, wherein the electrically insulating member comprises a pair of side plates sealed to opposing edges of the array and an end cap sealed to the ends of the array and the side plates, and wherein the anodes are on the side of the array defining the chamber.

5. The apparatus of claim 2, wherein the anode and cathode comprise electrocatalyst layers formed on opposite faces of the proton exchange membrane.

6. A fuel cell comprising:
   a) a plurality of membrane and electrode assemblies, each assembly having an anode including an electrically conducting member, a cathode including an electrically conducting member and a proton exchange membrane formed between the anode and cathode;
   b) a pair of electrically conducting cell frames securing the edges of each membrane and electrode assembly, wherein one cell frame is in electrical contact with the anode and another cell frame is in electrical contact with the cathode, wherein the anode and cathode frames of the same cell are electrically insulated from each other, and wherein each anode frame is electrically connected to no more than one cathode frame of an adjacent cell; and
   c) a fuel gas chamber in communication with the anodes, wherein the anodes are exposed to an oxidizable gas.

7. The fuel cell of claim 6, wherein the anode is a liquid compatible anode.

8. The fuel cell of claim 6, further comprising a plurality of cells forming an electrical series circuit.

9. The fuel cell of claim 6, wherein the plurality of cell frames form a series of fins.

10. The fuel cell of claim 9, further comprising a housing formed around the fins and a fan to provide forced convection of air over the cathodes.

11. The fuel cell of claim 10, wherein the fin width is less than about one centimeter and the fin spacing is less than about one centimeter.

12. The fuel cell of claim 11, wherein a stack volume less than about 500 milliliters produces about 50 Watts of electrical power.

13. The fuel cell of claim 10, wherein the conductive member is a carbon paper or cloth.

14. The fuel cell of claim 10, wherein the conductive member is a metal grid.

15. The fuel cell of claim 14, wherein the metal grid is in contact with the electrocatalytic region of the membrane and electrode assembly.

16. The fuel cell of claim 14, wherein the metal grid is in contact with the gas diffusion layer of the membrane and electrode assembly.

17. The fuel cell of claim 14, wherein the metal grid is in contact with the outer layer of the membrane and electrode assembly.

18. The fuel cell of claim 10, further comprising a plug for coupling multiple fuel cells in series.

19. The fuel cell of claim 6, wherein the anode and cathode are gas diffusion electrodes.

20. The fuel cell of claim 19, wherein the gas diffusion cathodes are exposed to air.

21. The fuel cell of claim 7, wherein the fuel gas is methanol.

22. A fuel cell stack comprising:
   a) a plurality of individual cells including a membrane and electrode assembly having an anode, an electrically conducting member in contact with the anode, a gas diffusion cathode, an electrically conducting member in contact with the cathode, and a proton exchange membrane between the anode and the cathode, wherein the electrically conducting member in contact with the anode in a first cell is electrically coupled to the electrically conducting member of a cathode in a second cell;
   b) a fuel chamber adjacent the anodes for delivery of gas or liquid fuel; and
   c) a fuel inlet port into the chamber.

23. The fuel cell stack of claim 22, wherein the electrically conducting member is a frame around the perimeter of a membrane and electrode assembly.

24. The fuel cell of claim 22, wherein the anode is a liquid compatible anode.

25. A modular fuel cell system comprising:
   a plurality of fuel cell stacks, each stack having an anode, a cathode, a fuel gas chamber, a male connector plug and a female connector plug, each plug including electrical contacts and a fuel gas coupling, wherein a male plug of a first stack and a female plug of a second stack can be coupled together so that the fuel gas chambers are in fluid communication and stacks are in electrical communication.

26. The fuel cell system of claim 25, wherein the configuration of the electrical contacts in the plugs determines whether the cells are connected in series or parallel.

27. The fuel cell system of claim 26, wherein the plurality of cell stacks apply a voltage of about 24 Volts when the cells are connected in series and a voltage of about 12 Volts when the cells are connected in parallel.

\* \* \* \* \*

UNITED STATES PATENT AND TRADEMARK OFFICE
CERTIFICATE OF CORRECTION

PATENT NO. : 5,709,961
DATED : January 20, 1998
INVENTOR(S) : Alan J. Cisar, Olvier J. Murphy, and Stanley F. Simpson It is certified that error appears in the above-indentified patent and that said Letters Patent is hereby corrected as shown below:

Column 1, 1st paragraph, change paragraph to read --This invention was made with Government support under contract DAAL01-95-C-3510 awarded by the U. S. Army. The Government has certain rights in this invention.--

Signed and Sealed this

Fourteenth Day of July, 1998

Attest:

BRUCE LEHMAN

*Attesting Officer*  *Commissioner of Patents and Trademarks*